United States Patent [19]

Frechin

[11] Patent Number: 4,930,194
[45] Date of Patent: Jun. 5, 1990

[54] SNAP HOOK FOR USE IN CLIMBING, POT HOLING OR SIMILAR ACTIVITIES

[76] Inventor: Jean P. Frechin, 215 chemin de la Croix des Pecles, 74400 Chamonix, France

[21] Appl. No.: 229,170

[22] PCT Filed: Nov. 21, 1986

[86] PCT No.: PCT/FR86/00394
§ 371 Date: Jul. 7, 1988
§ 102(e) Date: Jul. 7, 1988

[87] PCT Pub. No.: WO88/03826
PCT Pub. Date: Jun. 2, 1988

[30] Foreign Application Priority Data

May 24, 1985 [FR] France ............................. 8508009
May 23, 1986 [IT] Italy ............................. 3584086[U]

[51] Int. Cl.$^5$ ............................. A63B 29/00
[52] U.S. Cl. ............................. 24/573.5; 24/599.9
[58] Field of Search ............................. 24/233–235, 24/232 R, 241 P, 241 S P, 241 S B, 241 PP, 241 PS

[56] References Cited

U.S. PATENT DOCUMENTS

| | | | |
|---|---|---|---|
| 827,206 | 7/1906 | Billman | 24/234 |
| 3,677,361 | 7/1972 | Bertin | 24/232 X |
| 4,206,940 | 6/1980 | Altabe | 24/241 P X |

FOREIGN PATENT DOCUMENTS

| | | | |
|---|---|---|---|
| 1518783 | 3/1968 | France | 24/232 |
| 2519394 | 7/1983 | France . | |
| 21315 | of 1906 | United Kingdom | 24/233 |

Primary Examiner—James R. Brittain
Attorney, Agent, or Firm—Arnold, White & Durkee

[57] ABSTRACT

A snap hook for use in climbing, pot holing or similar activities, comprising a C-shaped body and an arm mounted pivotally about a pin positioned in the body. An end of the body and of the arm are complimentary shaped parts, male and female, respectively, the male part being T-shaped in a transverse section, the female part being of a complimentary shape; the two parts, male and female, are within the circumference of sections comprising the snap hook; and there is a peripheral clearance laterally and longitudinally between the two parts.

5 Claims, 1 Drawing Sheet

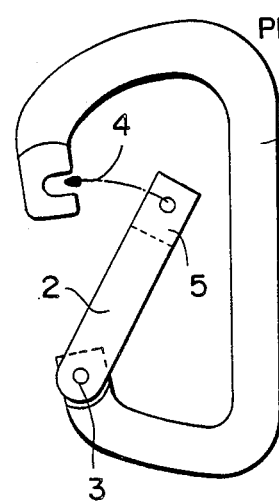
PRIOR ART
Fig. 1
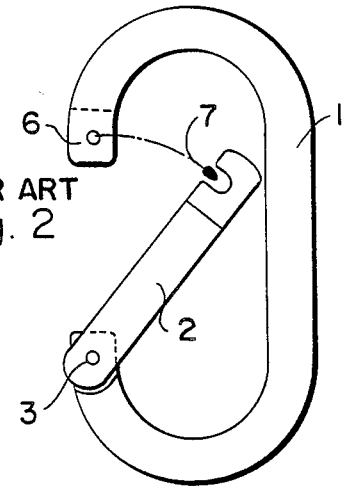
PRIOR ART
Fig. 2
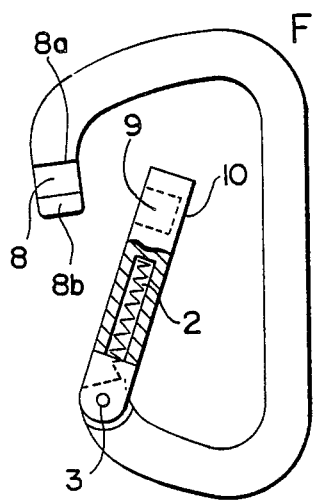
Fig. 3
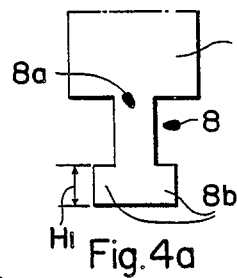 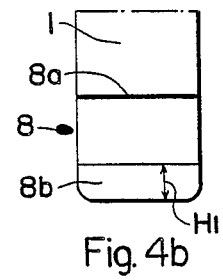
Fig. 4a   Fig. 4b
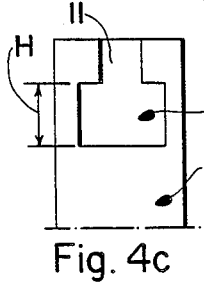 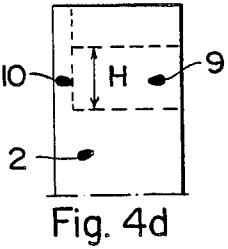
Fig. 4c   Fig. 4d
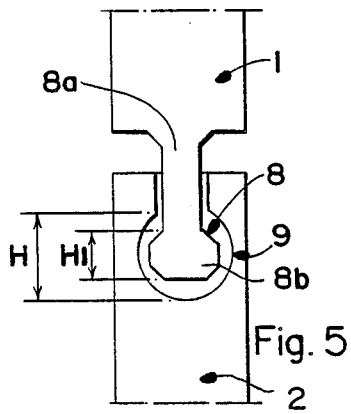
Fig. 5
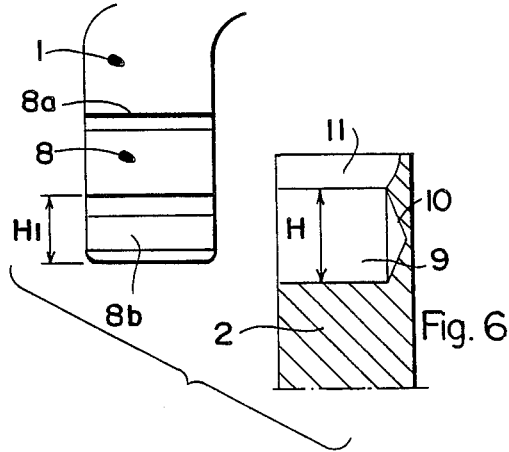
Fig. 6

SNAP HOOK FOR USE IN CLIMBING, POT HOLING OR SIMILAR ACTIVITIES

The present invention relates to an improvement in snap hooks used, among other things, in climbing and pot holing.

The snap hooks sold on the market until now have been conventionally constituted by a generally C-shaped body, the two ends of which are curved inward so as to be situated in a facing relationship, one with respect to the other, and by a finger mounted for pivoting about an axis, the axis mounted on one end of the body. A spring, placed inside the finger and resting at the other end against one end of the body, applies a constant force, thrusting the finger towards the outside against the other end of the body. Thus, during normal use, the user presses back the finger of the snap nap hook in order to place a rope in an inside space of the hook. Then he lets the finger return to its initial position, thereby confining the rope.

In order to avoid disadvantageous breaking of the snap hook, all currently used snap hooks present, in an opposite relationship to the axis on which the finger is pivotally mounted, a hook-shaped end, generally arranged on the body, and cooperating with a transversal key placed crosswise on the an fork of the finger. Accompanying FIGS. 1 and 2 illustrate two embodiments of snap hooks according to the prior art.

This particular arrangement presents one major disadvantage; indeed, when the user tries to remove the strap or the rope which is inside the snap hook, the strap or rope often remains fastened to the hook of the body since the hook is placed inside the space between the body and the finger. Such fastening often occurs at a time when the user is in a precarious balancing position, which can endanger his safety.

According to a recent solution, it has been proposed to place the "hook" part on the finger instead of on the body. This eliminates the risk of the strap attaching to the hook, but the presence of the hook on the finger does not eliminate the aforementioned disadvantage. In addition, the hook is produced by milling with a milling cutter of small diameter which often breaks.

Besides the problem created by the presence of aggressive parts in the snap hook opening zone, there is also the problem of maintaining a high resistance to breaking which such an assembly should have, such resistance being balanced between the male part and the female part. Also, in addition to a resistance lengthwise, the hook should also possess a resistance crosswise in order to prevent it from opening and to avoid all risks of the male and female parts becoming uncoupled. Indeed, for example when a fall occurs, it can happen that the snap hook hits a rock and that under the impact of the shock, and despite the presence of the spring, the finger moves back. Over a long enough period of time, this may cause a release of the pin from inside the hook, hence opening the snap hook and increasing the risk of it breaking, considering that the snap hook's resistance is lessened as a result.

A new type of snap hook has now been invented, the object of the present invention, which makes it possible to solve all of the aforementioned problems. Furthermore, snap hooks can be produced by simple machining means (i.e., milling and boring).

In general, the invention, therefore relates to an improvement in snap hooks used in climbing, pot holing, and other similar activities, which are constituted:

by a body having a general C shape, the two ends of which are curved inward so as to be positioned in a facing relationship, one with respect to the other;

by an arm mounted for pivoting about a pin mounted at one of the ends of the body, the arm being subjected to the action of an internal spring which tends to drive it outwardly against the other end of the body.

The two elements (body and arm) are produced from sectional pieces of a light alloy of identical cross-section, substantially cylindrical and constant. The ends of the body and arm can be moved apart one from the other, and have complementary shapes, male and female, respectively, allowing them to fit inside one another.

The snap hook according to the invention is characterized in that:

the male part and the female part of the ends of the body and of the arm are inscribed inside the volume of revolution of the sectional pieces;

the male part having a T-shaped cross-section, of which the base is placed in an arm articulation plane and extends over at least most of the length of the diameter of the sectional piece and of which the branches, which form lateral reliefs, have a total width which is smaller than the diameter of the sectional piece, the female part having a corresponding shape which also enables it to be inscribed inside the sectional piece and dimensions such that a peripheral play is kept not only laterally to allow the passage of the T-shaped male part, but also longitudinally, and the bottom of the female part or the sides of the male part form an abutment for the arm and limit its outward movement.

In the rest of the description, the invention will be described with reference to snap hooks in which the male part is produced on the body, whereas the female part is provided on the end of the movable arm. Obviously, this is not in any way restrictive, and the snap hooks according to the invention could also be produced in the reverse way.

Advantageously, and in practice:

the snap hook according to the invention is produced from a sectional piece of substantially cylindrical and constant section, of small external dimensions (8 to 12 mm generally);

the female part, designed to receive the two wings of the T-shaped part, has a general cylindrical shape of the axis substantially perpendicular to the arm;

the female part, designed to receive the two wings of the T-shaped part, has a slightly oblong shape.

The invention and the advantages that it brings about will, however, be more readily understood from the following examples of the embodiment given by way of example, non-restrictively, as illustrated in the accompanying figures, in which:

FIGS. 1 and 2 illustrate, as already stated, two types of snap hooks according to the prior art;

FIG. 3 illustrates a side view, as in FIGS. 1 and 2, of a snap hook produced according to the invention;

FIGS. 4a and 4b, 4c and 4d are, respectively, partial, enlarged views, on the one hand, of the male end of the body (FIGS. 4a and 4b), and on the other hand, of the female end of the arm (FIGS. 4c and 4d);

FIG. 5 shows an end view of another embodiment of the male and female ends of the body and of the arm in a snap hook according to the invention, both these elements being shown in engagement with one another, and, FIG. 6 is a side view of the embodiment shown in FIG. 5, the end of the arm being shown in cross-section and the two elements arm/body being apart one from the other.

Referring now to the accompanying drawings, FIGS. 1 and 2 illustrate two embodiments of the snap hook according to the prior art. Such snap hooks are essentially constituted of a body (1) having a general C-shape, the two ends of the C being curved inward being placed in a facing relationship with respect to one another. At one of the ends of the body, an arm (2) is mounted which pivots about a pin (3). The arm (2) is subjected to the action of an internal spring (not shown) which tends to drive it outwardly against the other end of the body (1). In order to allow the fitting of the two ends, one into the other, in the embodiment illustrated in FIG. 1, the end (5) of the arm (2) is fork-shaped, whereas the corresponding end of the body (1) comprises a hook (4). According to the embodiment illustrated in FIG. 2, it is the reverse, the end of the body (1) comprises a fork (6), whereas the end of the finger (2) comprises a hook (7). In both cases, when the snap hook is open, the parts forming the hook thus form an aggressive zone which can cause catching and wearing down of the rope when the rope is introduced or removed. Moreover, if the tensile strength in the longitudinal direction is good, there is still, with the tensile strength in the transversal direction, a risk of the snap hook opening and breaking since under a violent impact the arm can move back sufficiently to cause it to move out of the end of the body.

It is possible, with the snap hooks according to the invention (of which two embodiments are illustrated in FIGS. 3 to 6), to overcome the aforementioned disadvantages.

The snap hooks in these two embodiments are, as previously indicated, constituted of a body (1) and of an arm (2), both of which are mounted for pivoting via a pin (3) on one end of the body, said arm (2) also being subjected to the action of an internal spring schematically shown by rectangular box 20 which tends to push it outwardly.

According to the invention, the ends of the body (1) and of the arm (2), which can be moved apart one from the other, have complementary shapes, male and female, respectively, which make it possible for them to fit into each other. The dimensions of the male and female shapes are such that they are inscribed inside the volume of revolution of the conventional sectional pieces in light alloy, and of substantially cylindrical and constant cross-section, which are used in the manufacture of snap hooks.

To this effect the male part (8) has a T-shaped cross-section (see FIGS. 4a and 5), of which the base (8a), situated in the articulation plane of the arm (2), extends over at least most of the length of the diameter of the sectional piece. In the illustrated case, the base (8a) extends over the whole length. And as to the branches (8b) which form lateral reliefs, these have a total width which is less than the diameter of the sectional piece. The female part (9), provided on the end of arm (2), on the other hand, has corresponding shapes which also enable it to be inscribed inside the volume of revolution of the sectional pieces, the dimensions of the female part (9) being such that not only is there a slight play laterally, but there is also one longitudinally on either side of the branches (8b). To this effect, the height H of the recess (9) is greater than the thickness H1 of the branches (8b). In this particular embodiment, in order to limit the outward movement of the arm (2), the female part (9) is not drilled through, so as to form a wall (10) forming an abutment on the path of the arm.

In the embodiment illustrated in FIGS. 3 to 4d, the female part (9), similarly to the male part (8), is T-shaped and can be produced, for example, by electro-erosion. FIGS. 5 and 6 illustrate a variant according to the invention in which, although the T-shaped male part (8) of the body (1) is substantially the same as in the previous example and can be produced by milling, the part (9) is itself produced by drilling and milling. This particularly simple embodiment which also permits the production of chamfers in order to improve the resistance is as described hereafter. The female part (9) is produced by a simple drilling operation substantially perpendicularly to the arm (2) (for example, of 7 mm diameter for an arm of 11 mm diameter). If the target is to obtain an abutment (10) for the arm (2) against the body, said drilling will of course not be a through one. As to part (11), allowing the passage of the male part, this is produced by milling (of about 4 mm width) for a snap hook having the aforementioned dimensions.

As in the previous example, the height H of the female part (9) is greater than the height H1 of the male part, thus making it possible to have a vertical play which further improves the resistance to breaking of the snap hook.

By way of indication, snap hooks produced according to the invention from sectional pieces of 11 mm diameter show a tensile strength greater than 2200 DAN, without any weight increase, and while avoiding the presence of any aggressive parts in the snap hook opening zone.

Obviously, the invention is not limited to the examples described herein and, as indicated in the preamble, it is possible to provide the male part on the arm and the female part on the body. It is, furthermore, possible to produce snap hooks which comprise a rectilinear arm (2) as well as a bent or V-shaped arm (2); it is merely a case then to incline the milling of the male part so that it corresponds to the final path of the arm (2). The invention is also applicable to snap hooks of which the arm opens in a different plane from that of the snap hook. Similarly, the abutment (10) could be produced on the part (8) of the body (1) without departing from the invention.

It is also worth noting that such a method of producing the male and female parts gives an assembly showing a resistance which is perfectly balanced between these two parts. Moreover, because the male part extends a length which can equal the diameter of the sectional piece, such a type of snap hook offers a high tensile strength in the transversal direction, clearly higher than that of existing snap hooks and, moreover, due to the fact that the male part and the female part have a very long contact surface, all risks of the snap hook opening because of an impact against a wall, such as if the user falls, for example, are virtually eliminated.

It is finally worth noting that in the embodiment illustrated in FIGS. 5 and 6, the wall (10), forming an abutment between the end of the finger and the end of the body, also contributes to increasing the resistance to breaking at the upper part of the arm (2) of which the two lips tend to move apart under the pressure exerted by the part (8) when a high tensile force is applied on the snap hook (odd-numbered figures). It would also be possible to provide the upper part of the arm with an inclined face which would reach toward a corresponding part of the body in order to produce the abutment for the finger on said body. Although such an embodiment facilitates the machining of T-shaped open-through forms, it does not permit an increase of the resistance to breaking of such forms.

I claim:

1. A snap hook comprising:
a C-shaped body having two ends which are bent towards one another;
an arm mounted for pivoting about a pin positioned at one of said ends of the body, said arm being subjected to a force which urges an end of the arm outward against the other of said ends of the body, said body and said arm each being produced from a sectional piece of light alloy material of identical cross-section which is substantially cylindrical and of constant diameter, said other end of the body and said end of the arm being separable from one another and being shaped as complimentary male and female parts, respectively, thereby enabling said male and female parts to fit inside one another when said end of the arm is driven outward against said other end of the body;
wherein said male part and said female part are inscribed inside the circumference of each sectional piece of said body and said arm, respectively, said male part has a T-shaped cross-section of smaller width than the diameter of said body and substantially the same diameter as said body when viewed in a direction perpendicular and parallel, respectively, to the pivoting pin of said body, and said female part has a complimentary T-shaped cross-section with respect to said male part which is within the circumference of said arm, and dimensions such that a peripheral clearance is left laterally and longitudinally to allow passage of said male part so as to act as a means for peripheral play both laterally and longitudinally, a bottom of said female part corresponds to an extreme end of said male part, said main body portion forming an abutment for the arm which limits its outward movement.

2. The snap hook of claim 1, wherein said T-shaped cross-section has a main body portion, situated in articulation planes of the arm, which extends most of the diameter of the sectional piece of the body, said main body portion further comprising two integral branches at an extreme end of said male part, each of said branches forming a lateral relief and having a width which is smaller than the diameter of each sectional piece of the body.

3. The snap hook of claim 1, wherein said female part, designed to receive the two branches of said male part, has a generally cylindrical shape, an axis of which is substantially perpendicular to said arm.

4. The snap hook of claim 1, wherein said end of the arm comprises a continuous and completely cylindrical surface inside the snap hook.

5. The snap hook of claim 1, wherein said female part, designed to receive the two branches of said male part, has a slightly oblong shape.

* * * * *